(12) United States Patent
Hars

(10) Patent No.: US 11,283,619 B2
(45) Date of Patent: Mar. 22, 2022

(54) BIT MIXER BASED PARALLEL MAC AND HASH FUNCTIONS

(71) Applicant: The Boeing Company, Chicago, IL (US)

(72) Inventor: Laszlo Hars, Lafayette, CO (US)

(73) Assignee: THE BOEING COMPANY, Chicago, IL (US)

( * ) Notice: Subject to any disclaimer, the term of this patent is extended or adjusted under 35 U.S.C. 154(b) by 350 days.

(21) Appl. No.: 16/447,374

(22) Filed: Jun. 20, 2019

(65) Prior Publication Data

US 2020/0403802 A1    Dec. 24, 2020

(51) Int. Cl.
| H04L 29/06 | (2006.01) |
| H04L 9/32 | (2006.01) |
| H04L 9/06 | (2006.01) |
| G06F 16/901 | (2019.01) |

(52) U.S. Cl.
CPC .......... *H04L 9/3242* (2013.01); *H04L 9/0643* (2013.01); *G06F 16/9027* (2019.01)

(58) Field of Classification Search
CPC ... H04L 9/3242; H04L 9/0643; H04L 9/0631; H04L 9/003; G06F 16/9027; G06F 16/9014
See application file for complete search history.

(56) References Cited

U.S. PATENT DOCUMENTS

| 7,093,137 B1 * | 8/2006 | Sato | .................... G06F 21/6227 713/193 |
| 7,469,344 B2 * | 12/2008 | Folmsbee | ........... G06F 9/30145 712/E9.028 |
| 7,802,108 B1 * | 9/2010 | Master | ................. G06F 15/7867 713/193 |

(Continued)

FOREIGN PATENT DOCUMENTS

| CN | 105429749 A * | 3/2016 | |
| EP | 3337082 A1 * | 6/2018 | ........... H04L 9/0861 |

(Continued)

OTHER PUBLICATIONS

Hars, "Information Security Application of Bit-Mixers", 2016, (Year: 2016).*
Hars, "Hardware Bit-Mixers", 2016, (Year: 2016).*

*Primary Examiner* — John B King
(74) *Attorney, Agent, or Firm* — MH2 Technology Law Group LLP

(57) ABSTRACT

A device for, and method of, generating coded data from input data are disclosed. The device includes: an input for receiving input data, where the input data includes a plurality of data blocks; a plurality of bit mixers coupled in parallel to the input, where each bit mixer is configured to receive at least one data block of the plurality of data blocks, where no bit mixer of the plurality of bit mixers is configured to receive a same data block of the plurality of data blocks as another of the bit mixers of the plurality of bit (Continued)

mixers, and where no two bit mixers of the plurality of bit mixers are configured to produce same output values for same input values; a combiner communicatively coupled in parallel to the plurality of bit mixers; and an output communicatively coupled to the combiner, the output configured to provide coded data.

18 Claims, 6 Drawing Sheets

(56) References Cited

U.S. PATENT DOCUMENTS

| | | | | |
|---|---|---|---|---|
| 7,809,135 | B2 * | 10/2010 | Johnson | H04L 9/0631 380/44 |
| 7,894,599 | B2 * | 2/2011 | Rigler | G06F 21/6209 380/28 |
| 7,937,595 | B1 * | 5/2011 | Kumar | G06F 21/10 713/192 |
| 8,121,286 | B2 * | 2/2012 | Halevi | H04L 9/002 380/29 |
| 8,370,645 | B2 * | 2/2013 | Asnaashari | G06F 12/1408 713/193 |
| 8,401,600 | B1 * | 3/2013 | Filippov | H01L 39/223 505/190 |
| 8,504,849 | B2 * | 8/2013 | Jogand-Coulomb | G06F 21/78 713/194 |
| 9,252,943 | B1 | 2/2016 | Hars | |
| 9,946,662 | B2 | 4/2018 | Hars | |
| 10,146,701 | B2 | 12/2018 | Hars | |
| 10,313,128 | B2 | 6/2019 | Hars et al. | |
| 2003/0198345 | A1 * | 10/2003 | Van Buer | H04L 9/0631 380/43 |
| 2009/0080647 | A1 * | 3/2009 | Mantin | H04L 9/0625 380/29 |
| 2009/0202070 | A1 * | 8/2009 | Mantin | H04L 9/0618 380/44 |
| 2013/0117577 | A1 * | 5/2013 | Hars | G06F 21/85 713/190 |
| 2014/0211937 | A1 * | 7/2014 | Coric | H04L 9/0861 380/28 |
| 2017/0104586 | A1 * | 4/2017 | Hars | H04L 9/003 |
| 2018/0176011 | A1 * | 6/2018 | Hars | H04L 9/0625 |
| 2019/0109715 | A1 | 4/2019 | Hars | |
| 2020/0076584 | A1 * | 3/2020 | Steele | H04L 67/1097 |

FOREIGN PATENT DOCUMENTS

| | | | | |
|---|---|---|---|---|
| EP | 3468147 | A1 * | 4/2019 | H04L 9/3242 |
| EP | 3503463 | A1 * | 6/2019 | H04L 9/0643 |
| JP | 2000238612 | A * | 9/2000 | B60R 25/04 |
| WO | WO-2007060587 | A1 * | 5/2007 | H04L 9/0662 |

* cited by examiner

BIT MIXER BASED PARALLEL MAC AND HASH FUNCTIONS

FIELD

This disclosure relates to hash functions and message authentication codes, e.g., used for information assurance.

BACKGROUND

Hash functions and message authentication code functions (MACs) may be used, for example, to verify that an adversary has not changed data in a message. This may be done by applying the hash or MAC function to the message to create a digital fingerprint, a.k.a., a message digest, from which adversaries cannot reconstruct the message (or equivalent alternatives). A common property of cryptographic hash and MAC functions is that, with reasonable resources, no one can create two different messages that produce the same message digest. Hash functions satisfy this property and do not require secret keys. MAC functions satisfy this property and use secret keys to produce message digests; only with an appropriate key can someone compute the message digest using a MAC.

Security operations, such as hash and MAC functions, may be subject to physical attacks, most notably side channel attacks, which observe, e.g., the fluctuation of power use in time, electromagnetic radiation emanated by the electronic circuits when security related operations are performed, or the variation of response time with different parameters.

SUMMARY

According to various embodiments, a device for generating coded data from input data is presented. The device includes: an input for receiving the input data, wherein the input data comprises a plurality of data blocks; a plurality of bit mixers communicatively coupled in parallel to the input, wherein each bit mixer of the plurality of bit mixers is configured to receive at least one data block of the plurality of data blocks, wherein no bit mixer of the plurality of bit mixers is configured to receive a same data block of the plurality of data blocks as another of the bit mixers of the plurality of bit mixers, and wherein no two bit mixers of the plurality of bit mixers are configured to produce same output values for same input values; a combiner communicatively coupled in parallel to the plurality of bit mixers; and an output communicatively coupled to the combiner, the output configured to provide coded data corresponding to the input data.

Various optional features of the above embodiments include the following. The coded data may include a cryptographic hash of the input data. Each bit mixer of the plurality of bit mixers may operate under control of different subkey data. The coded data may include a message authentication code for the input data. Each bit mixer of the plurality of bit mixers may be hard coded in hardware. The plurality of bit mixers may consist of a number n of bit mixers in parallel, and the device may have n times less side channel leakage compared to actions of the device executed on a single programmable microprocessor. Each bit mixer of the plurality of bit mixers may produce a respective output from a respective input in a single clock cycle. Each bit mixer of the plurality of bit mixers may include a second plurality of second bit mixers configured in parallel. Data from an enumeration of the plurality of data blocks may be provided to the plurality of bit mixers. Each of the bit mixers of the plurality of bit mixers may include at least one of a XOR tree based bit mixer, a substitution-permutation network based bit mixer, or a double-mix Feistel network based bit mixer.

According to various embodiments, a method of generating coded data from input data using bit mixers is presented. The method includes: receiving the input data, wherein the input data comprises a plurality of data blocks; passing the plurality of blocks to a plurality of bit mixers communicatively coupled in parallel to the input, wherein each bit mixer of the plurality of bit mixers receives at least one data block of the plurality of data blocks, wherein no bit mixer of the plurality of bit mixers receives a same data block of the plurality of data blocks as another of the bit mixers of the plurality of bit mixers, and wherein no two bit mixers of the plurality of bit mixers are configured to produce same output values for same input values; combining outputs of the plurality of bit mixers to produce the coded data corresponding to the input data.

Various optional features of the above embodiments include the following. The coded data may include a cryptographic hash of the input data. Each bit mixer of the plurality of bit mixers may operate under control of different subkey data. The coded data may include a message authentication code for the input data. Each bit mixer of the plurality of bit mixers may be hard coded in hardware. The plurality of bit mixers may consist of a number n of bit mixers in parallel, and a device performing the method may have n time less side channel leakage compared to a single programmable microprocessor executing the method. Each bit mixer of the plurality of bit mixers may produce a respective output from a respective input in a single clock cycle. Each bit mixer of the plurality of bit mixers may include a second plurality of second bit mixers configured in parallel. The method may further include providing data from an enumeration of the plurality of data blocks to the plurality of bit mixers. Each of the bit mixers of the plurality of bit mixers may include at least one of a XOR tree based bit mixer, a substitution-permutation network based bit mixer, or a double-mix Feistel network based bit mixer.

BRIEF DESCRIPTION OF THE DRAWINGS

The accompanying drawings, which are incorporated in and constitute a part of this specification, illustrate the present teachings and together with the description, serve to explain the principles of the disclosure.

Figure 1:
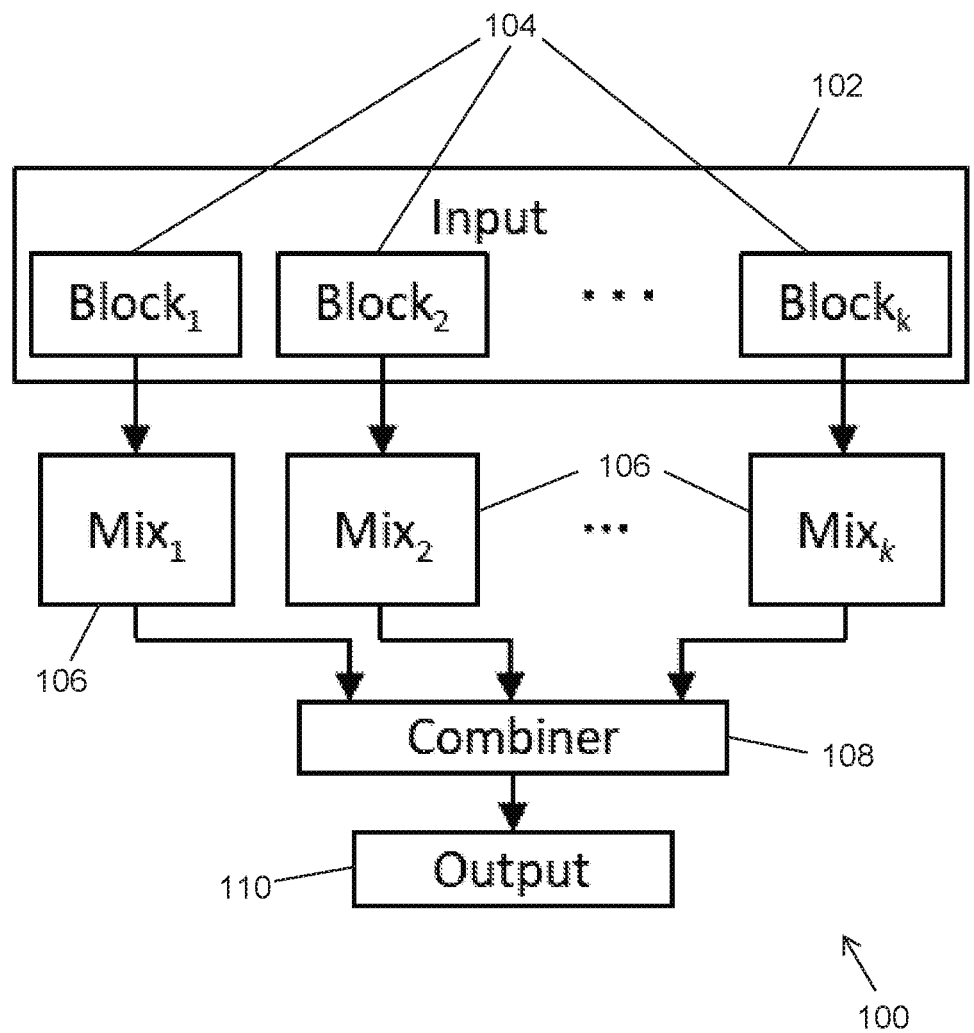
FIG. 1 is a schematic diagram of a system for generating coded data from input data using parallel bit mixers according to various embodiments.

It should be noted that some details of the figures have been simplified and are drawn to facilitate understanding of the present teachings, rather than to maintain strict structural accuracy, detail, and scale.

DETAILED DESCRIPTION

Reference will now be made in detail to the disclosed examples, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific examples. These examples are described in sufficient detail to enable those skilled in the art to practice them and it is to be understood that other examples may be utilized and that changes may be made without departing from the scope of the disclosure. The following description is, therefore, merely exemplary.

I. Introduction

In the field of information assurance, secure (cryptographic) hash functions and message authentication codes (MACs) play key roles. They allow entities to verify that some input data maps to a given message digest, without allowing an adversary to reconstruct the message (or equivalent alternatives) from the digest. There are applications where either high security levels with appropriately chosen message digest sizes are needed, or where the security requirements may be relaxed, but faster running time and lower power use is important. For such applications, flexible constructions are desired: either low-power, very fast hash and MAC functions, or highly secure complex ones, all of which should still be resistant to side channel attacks.

Existing hash and MAC functions are inflexible with too few choices for sizes of their input, output, and internal buffers. They are relatively slow, even when implemented in electronic hardware, consume a relatively large amount of power/energy, and they are very hard to protect from side channel attacks. Their security levels are fixed to a handful values, even though many applications in commercial and military aviation may utilize higher levels of security, or better performance, than these existing solutions.

Some embodiments provide flexible hash and MAC functions, which can be implemented in hardware to be either more secure (e.g., leaking less information on side channels) than existing techniques, or faster (by orders of magnitude) and more power efficient than existing techniques. This is advantageous, because for some applications, speed of operation and power consumption is of primary importance, but security requirements may be relaxed; for other applications, high security (i.e., requiring more computation time and/or memory to break) is of primary importance.

Some embodiments are based on complex functions mapping bit sequences to other bit sequences, referred to herein as "bit mixers". Bit mixers are very fast, and can use arbitrary small or large amounts of key material. If the key material is kept secret, some embodiments provide MAC functions of selectable security levels. If the key material is fixed (hard coded) and made public, some embodiments (e.g., the hard to invert versions) provide flexible hash functions. Using them in communication and computing systems is low cost, with a no significant increase of circuit size, and they reduce the power usage compared to existing techniques. Because of that, deployed systems can use slower electronic components, further reducing both costs and the energy and power consumption of the computing system, at improved speed and security.

Embodiments may be used in a variety of technologies. By way of non-limiting example, embodiments may be implemented in secure computing systems, such as in in-flight computers, military and space programs, corporate networks, personal and laptop computers, smart mobile devices, secure communication networks, high performance computers, secure microprocessors, security electronics, and security software.

II. MAC and Hash Functions

A hash function maps data of arbitrary size to data of fixed size. The values returned by a hash function are called hash values, or simply hashes. Desirable properties of hash functions include: determinism, uniformity, and nonlinearity.

Hash functions may be used in data structures called hash tables, which are widely used in computer software for rapid data lookup. Hash functions accelerate table or database lookup by using the hash values as addresses of records and also by detecting duplicated records in a large file. If the hash function depends on a secret key, then it is a MAC.

Hash functions are also used in cryptography (information assurance). A cryptographic hash function allows an entity to easily verify that some input data maps to a given hash value; but if the input data is unknown, it is deliberately made difficult to reconstruct it (or equivalent alternatives) by knowing only the hash value. This property is used for assuring integrity of transmitted or stored data in the presence of an active adversary, and can also be the building block for MACs, which provide message authentication codes, as in the case of the FIPS standard HMAC construction. Desirable security related properties of such hash functions include: pre-image resistance, second pre-image resistance, and collision resistance. Constructions of flexible hash value (a.k.a., message digest) sizes are often needed to provide desired security strengths, that is, requiring infeasibly large amounts of resources to break the security requirements. In general, the larger the size of the hash value, the more secure the hash function is, when all other properties of the hashing are kept constant.

Even in the field of information security, there are applications where the requirements for the hash/MAC function can be relaxed, for example, when neither the input nor the output of the hash function is accessible to an adversary, which is the case of key generators and key-rolling applications. Relaxed security requirements can also be the case for random number generators, when a large but fixed number of imperfect entropy sources provide the input of the hash function, which mixes them together and reduces their aggregate size to fit a fixed buffer, thereby increasing the per bit entropy (a type of whitening). The original entropy may be preserved to the extent possible. (XORing all the entropy bits is wasteful, as it reduces the output to a single bit, and also imperfect. For example, when the entropy sources get correlated, their effects may cancel at XORing, and the corresponding entropy is lost.)

There are also applications where the input is large, but of a fixed size, and where the input is reduced to a smaller size while keeping as much entropy from the input as possible. For example, for unbalanced Feistel ciphers, which are used in large-block encryption algorithms (e.g., Skipjack, XCB, etc.), a large bit mixer function can directly be built in electronic hardware. Only the desired number of bits are kept from the output, or the output bits are folded to the desired length by, e.g., a bitwise XOR operation.

Other applications include checksum-type fingerprints of large data sets, like long files or collections of files. Cyclic redundancy check ("CRC") algorithms are commonly used to detect random errors in data. However, known CRC algorithms are too simple, e.g., the effects of certain (often randomly occurring) multiple errors may cancel. If malicious, intentional changes in the data are not of concern, only random errors, integrity checking hash functions may be built from bit mixers as disclosed herein. If the bit mixers are implemented in electronic hardware, the resulting hash/MAC functions are two or three orders of magnitude faster than current standard cryptographic hash functions, albeit at this speed they are less secure, so they cannot replace cryptographic hash functions in every application. Nevertheless, such hash functions are suitable replacements for CRC algorithms.

III. Example Embodiments

This section presents a family of hash and MAC functions constructed from bit mixers. The bit mixers can be chosen with arbitrary input and output sizes, and of selectable complexity, to be chosen in accordance with security, power and speed requirements for a particular application.

Bit mixers use large amounts of key material, which are parsed into chunks, referred to herein as "subkeys". If the key material is kept secret, then the constructions provide MAC functions (only with the knowledge of the key material can anyone construct or verify the message authentication code). If the key material is fixed, e.g., hard coded, and made public, then the constructions provide hash functions. For secure hash functions, the constructions may incorporate hard to invert or non-invertible bit mixers.

Further, for increased security (complexity), bit mixers can be cascaded (the output of one forms the input of the following bit mixer). With sufficiently many stages such a construction becomes a secure cipher. This property allows for tradeoffs between speed and security. Nevertheless, when the bit mixers are implemented in hardware, at all security levels the resulting performance (speed, power) is at least an order of magnitude better than that of existing techniques.

If more than one input data block is available at the same time for an application, the construction can exploit parallelism. Simply adding (or XORing) the output of multiple identical bit mixers that process different input blocks in parallel is not suitable, however, because changing the order of the input blocks would not affect the hash value. This would violate a desirable property of hash functions that it should be difficult to construct another message that gives the same hash value as the original massage. However, the construction presented below in reference to FIG. 1 is suitable.

FIG. 1 is a schematic diagram of a system 100 for generating coded data from input data using parallel bit mixers according to various embodiments. As shown, system 100 includes input 102, which may be implemented as a bus, for example. Input 102 is configured to receive a plurality of k blocks 104 of input data, labeled "Block$_1$, Block$_2$, . . . , Block$_k$" in FIG. 1. Each block 104 may be the same size. Input 102 may be configured to receive, or parse, the input data in the form of blocks 104. System 100 also includes a plurality of bit mixers 106. Bit mixers 106 may be combined from simpler bit-mixers (working in parallel or sequentially) for enhanced security, e.g., to prevent an adversary from building linear models, which could be solved with a sufficient amount of collected data. System 100 may process blocks 104 of input data concurrently or sequentially by providing them to this plurality bit mixers 106, which may be different or "diversified" as described further below. Every block 104 of the message to be hashed is thus processed by a diverse bit mixer 106. The outputs of bit mixers 106 are then combined by combiner 108, which may be implemented as, e.g., a bitwise XOR-tree, or an XOR-tree in where one or more layers are replaced with small (fast) compression S-Boxes, having fewer output bits than input bits. The output of combiner 108 is communicatively coupled to output 110, which provides coded data corresponding to the input data provided to input 102. Output 110 may be implemented as a bus according to various embodiments.

There are many ways to make bit mixers 106 different, i.e., such that no two bit mixers 104 are configured to produce the same outputs from the same inputs. (Different bit mixers may, rarely, produce the same output from the same input data in a completely sporadic and coincidental manner, for a handful of input data values; however, bit mixers 106 are configured so as to produce different outputs from different inputs for the vast majority of input data, e.g., for more than 99.9999% of input data values.) Techniques for configuring bit mixers 106 to be different include the following.

According to a first technique for configuring bit mixers 106 to be different, each of bit mixers 106 is architecturally the same, but each of bit mixers 106 uses different subkeys. According to such embodiments, each of bit mixers 106 is of the same construction, but each receives and utilizes different subkeys, e.g., by taking the subkeys from a key storage from different offsets.

According to a second technique for configuring bit mixers 106 to be different, a block counter (block index or block enumeration) is mixed into the subkeys of each of bit mixers 106. Here, a "block counter" refers to an index, or enumeration, of blocks 104. For example, as depicted in FIG. 1, blocks 104 labeled "Block$_1$", "Block$_2$", . . . , "Block$_k$" have respective block indices, or an enumeration, as 1, 2, . . . , k. These values may be combined with the subkeys used in each of bit mixers 106. The bits of a given block enumeration may be shuffled and/or repeated, to extend its length to the same as the subkey size, if not already of such length, or folded using XOR, if longer than the subkey size. The block counter values, adjusted for length if necessary to be of the same length as that of the subkeys used in bit mixers 106, are then combined with the subkeys by, e.g., XOR. In this manner, each bit mixer may be configured to be different.

According to a third technique for configuring bit mixers 106 to be different, a block counter (as described above) is mixed into the inputs of each of bit mixers 106. That is, block counter values may be combined with the data of blocks 104 that are then passed to each of bit mixers 106. The bits of a given block counter may be shuffled and/or repeated, to extend its length to the same as the block size, if not already of such length, or folded using XOR, if longer than the block size. The block counter values, adjusted for length if necessary to be of the same length as that of blocks 104, are then combined with the data of each respective block using, e.g., XOR or concatenation. A formula for such combination may be expressed as, by way of non-limiting example, Block$_i$⊕i, for i≤k, where ⊕ represents XOR or concatenation, and i may be processed as disclosed herein to be of fixed length, e.g., the same length as Block$_i$.

According to a fourth technique for configuring bit mixers 106 to be different, each of bit mixer 106 may have a different architecture. Examples of various bit mixer architectures are presented in Section IV, below. Alternately, or in addition, bit mixers 106 may be of different combinations of a few different bit mixer architectures. For example, an embodiment according to this fourth technique may utilize for $Mix_1$ an XOR-tree based bit mixer followed by a substitution-permutation network based bit mixer, may utilize for $Mix_2$ a substitution-permutation network based bit mixer followed by a double-mix Feistel network based bit mixer, and may utilize for $Mix_k$ (e.g., where k=3), a double-mix Feistel network based bit mixer followed by an XOR-tree based bit mixer. Other serial or parallel combinations are possible.

According to some embodiments, prior to output 110, the data processed by combiner 108 may be further processed, e.g., by another bit mixer. This improves the security with very little additional processing time. Further, this provides a protection against a potential attack avenue. Specifically, without an additional bit mixer, when the combiner is a bitwise XOR tree, and one input block is varied while keeping the others unchanged, the XOR of two final hash values would be the same as the XOR of the affected bit mixer outputs.

The combining of simple diverse bit mixers 106 ensures that message blocks 104 cannot be permuted without altering the overall message digest, i.e., the data output by output 110. That is, the diversity of bit mixers 106 ensures that changing the order of the message blocks 104 results in a different message digest (hash or MAC value).

System 100 may be implemented in hardware or software. For software implementation, each of bit mixers 106 may be implemented as software routines. That is, for software implementation, one or more programmable computer chips may be used. For hardware implementation, each of bit mixers 106 may be implemented in dedicated hard-coded processing circuitry. That is, for hardware implementations, each of bit mixers 106 may be hard coded in hardware. Such hard coding in hardware may be implemented in non-programmable hardware. Alternately, or in addition, each of bit mixers 106 may be implemented in firmware.

According to some embodiments where bit mixers 106 are implemented in dedicated hard-coded processing circuitry, there may be fewer bit mixers 106 than blocks 104 of input data. In this case, the same physical bit mixer hardware cores may be re-used for processing later input blocks, but configured to be differently diversified (e.g., for each new invocation, using different keys according to the second and third techniques for configuring bit mixers 106 to be different as described above). If there are k hardware bit mixers 106, then k blocks 104 can be processed in parallel at one step, providing a k-fold speedup compared to hashing with just one bit mixer core. Because the bit mixers are relatively small electronic circuits, hundreds of them may be laid out in a VLSI ASIC, thereby achieving two orders of magnitude speedup.

Some embodiments, e.g., where bit mixers 106 are implemented in dedicated hard-coded processing circuitry, provide a pronounced improvement in side channel leakage compared to existing techniques. For example, if a hash or MAC function is implemented in a programmable processor (as opposed to dedicated hard-coded circuitry), only one action can be performed at a time. (Such actions include bit sums, XOR operations, permutation operations, etc.) In such circumstances, an adversary can perform differential power analysis to break the hash or MAC function. By contrast, the disclosed technique, if implemented in dedicated hard-coded processing circuitry, can exploit parallelism to perform hundreds or thousands of actions simultaneously. Such simultaneous execution masks information that would otherwise be exploitable for differential power analysis. This security advantage scales with the number of bit mixers 106 in parallel. Thus, n bit mixers 106 implemented in parallel in dedicated hard-coded processing circuitry leak n times less side-channel information than a comparable hash function performed by a programmable processor. For example, an embodiment with ten bit mixers in parallel leaks ten times, or an order of magnitude, less side channel information.

Some embodiments, e.g., where bit mixers 106 are implemented in dedicated hard-coded processing circuitry, provide a pronounced improvement in speed and power consumption compared to existing techniques. For example, an embodiment may perform eight iterations (i.e., eight stages) using eight bit mixers arranged in parallel. In comparison to SHA256 executed by an Intel processor with cryptography extension, which performs 64 iterations, such an embodiment is expected to consume less power due to the simpler actions in the iterations. Further, in comparison to the SHA256 example, such an embodiment would be expected to perform eight times faster due to the eight times fewer iterations. In more detail, processing time by each of bit mixers 106 includes about 6-8 NAND gate delays plus delays due to permutations, which are performed in wiring and therefore subject to essentially no delay, for a total on the order of one hundred picoseconds for eight stages, when 14 nm technology is used for manufacturing the ASIC. Adding additional bit mixers in parallel requires no additional processing time beyond the time the combiner needs. With eight stages of bit mixers arranged in parallel, processing time is still less than 0.2 nanoseconds, which is well within a single clock cycle of a 5 GHz processor. In contrast, the standard hash function SHA256 requires 64 clock cycles to operate even on microprocessors with hardware support for this hash function.

System 100 may be implemented as a hash function or as a MAC function. Bit mixers 106 in the iterative and parallel hash function construction of system 100, as discussed above, depend on subkeys derived from sets of public key material. The key material can be generated from one or more smaller keys, e.g., by another bit-mixer or cryptographic expansion functions (e.g., the streams of cryptographic stream ciphers). If the key material is not hard coded, but kept secret and shared between communicating parties, then system 100 forms a MAC function. If the key material is hard coded or publicly known, then system 100 forms a hash function.

Figure 2:
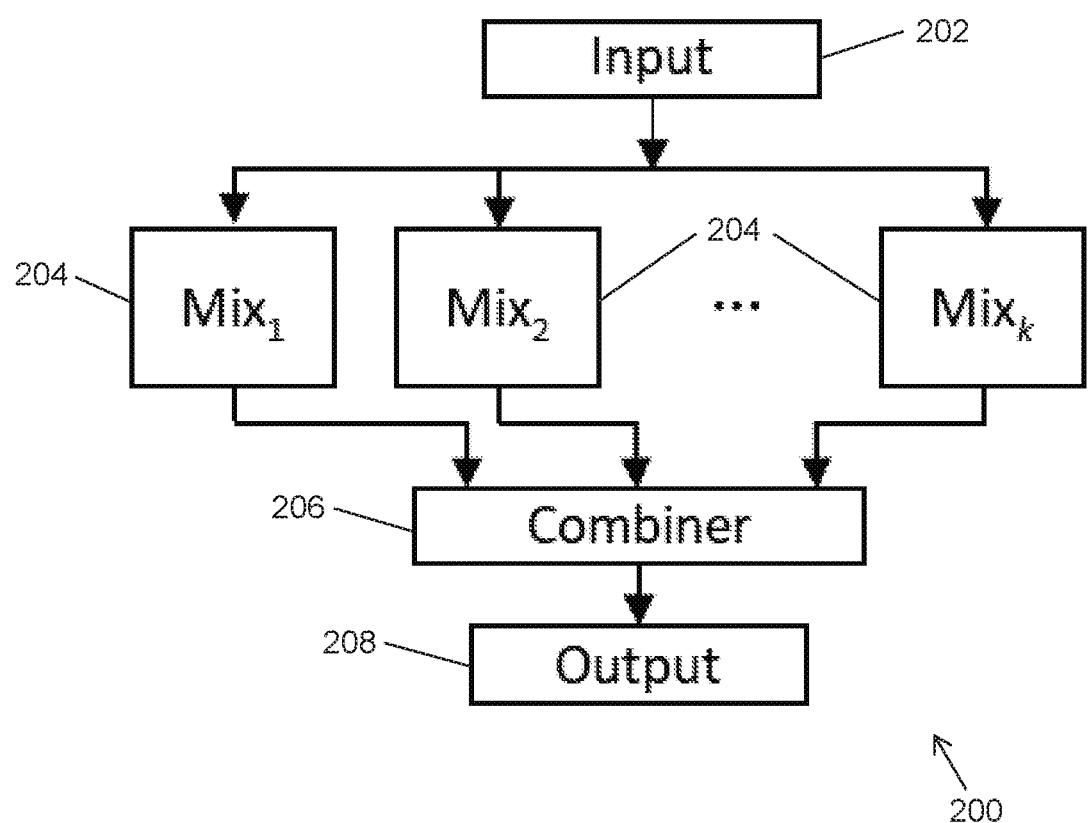
FIG. 2 is a schematic diagram of a cluster of bit mixers in parallel according to various embodiments.

FIG. 2 is a schematic diagram of a cluster 200 of bit mixers 204 in parallel according to various embodiments. Cluster 202 includes input 202, which may be a bus according to various embodiments. Input 202 parses input data into parts and provides the parts to all the bit mixers 204. The outputs of bit mixers 204 are combined by combiner 206, which may be implemented as bitwise XOR-trees with possibly some S-Box layers, to produce secure compression functions. The output of combiner 206 is provided to output 208, which may be implemented as a bus according to various embodiments.

Cluster 200 may be implemented in system 100 according to various embodiments. In particular, each of bit mixers 106 in system 100 may be replaced by an instance of cluster 200. In such an embodiment of system 100, each cluster 200 is configured to be different from every other cluster 200. For example, each set of bit mixers 204 from among the plurality of instances of cluster 200 in system 100 may be differently configured, e.g., using any of the four techniques for providing diverse bit mixers as disclosed above in reference to FIG. 1. Thus, according to a first technique, each set of bit mixers 204 may utilize different subkey material from that utilized by the bit mixers 204 of any other cluster 200. According to a second technique, a block counter for blocks 104 may be mixed in to the subkey material used in bit mixers 204. In such embodiments, each of bit mixers 204 in a single cluster 200 may utilize the same block counter, with each cluster 200 using a different block counter in its respective bit mixers 204. According to a third technique, a block counter for blocks 104 may be mixed in to the respective blocks provided to each instance of cluster 200. In such embodiments, each of blocks 104 is provided to a different cluster 200, and each cluster 200 combines a respective block counter with its respective block prior to completing processing. According to a fourth technique, each set of bit mixers 204 in each cluster 200 may have a different architecture. For example, a first cluster 200 may utilize only XOR-tree based bit mixers, a second cluster 200 may utilize only substitution-permutation network based bit mixers, and a third cluster 200 may utilize only double-mix Feistel network based bit mixers. Alternately, each cluster 200 may utilize a different ordered combination of bit mixer types.

Replacing single bit mixers 106 with clusters 200 of bit mixers in embodiments of system 100 greatly enhances security. In such embodiments, the output of any simple bit-mixer is hidden, masked by the output of the other bit-mixers, making the construction more secure.

IV. Bit Mixer Examples

This section provides example properties of bit mixers, and example bit mixer architectures, suitable for utilizing in systems 100 and 200 according to various embodiments. Bit mixers may be implemented as reduced round ciphers with arbitrary block sizes. The inputs can be padded, or the outputs folded together (e.g., via XOR functions or compression S-Boxes) for the required sizes of the inputs and outputs of the bit-mixers. Example desirable properties of bit mixers include the following. Note that bit mixers according to various embodiments may have one or more of the listed properties.

(1) The fixed lengths of the input and output values can be independently and arbitrarily chosen;
(2) Every input bit affects every output bit;
(3) Simple changes in the input cause on average half of the output bits to change;
(4) A series of simple changes in the input yield output values without apparent correlation to the input or to the change pattern of the input, i.e., standard statistical tests accept the output sequence as random; and
(5) Parameters (subkeys) alter the behavior of the function.

The term "simple change" above can refer to one in which less than half of the bits change simultaneously. Alternately, a "simple change" is a change that results from a software-based transformation using fewer than a dozen instructions.

Figure 3:
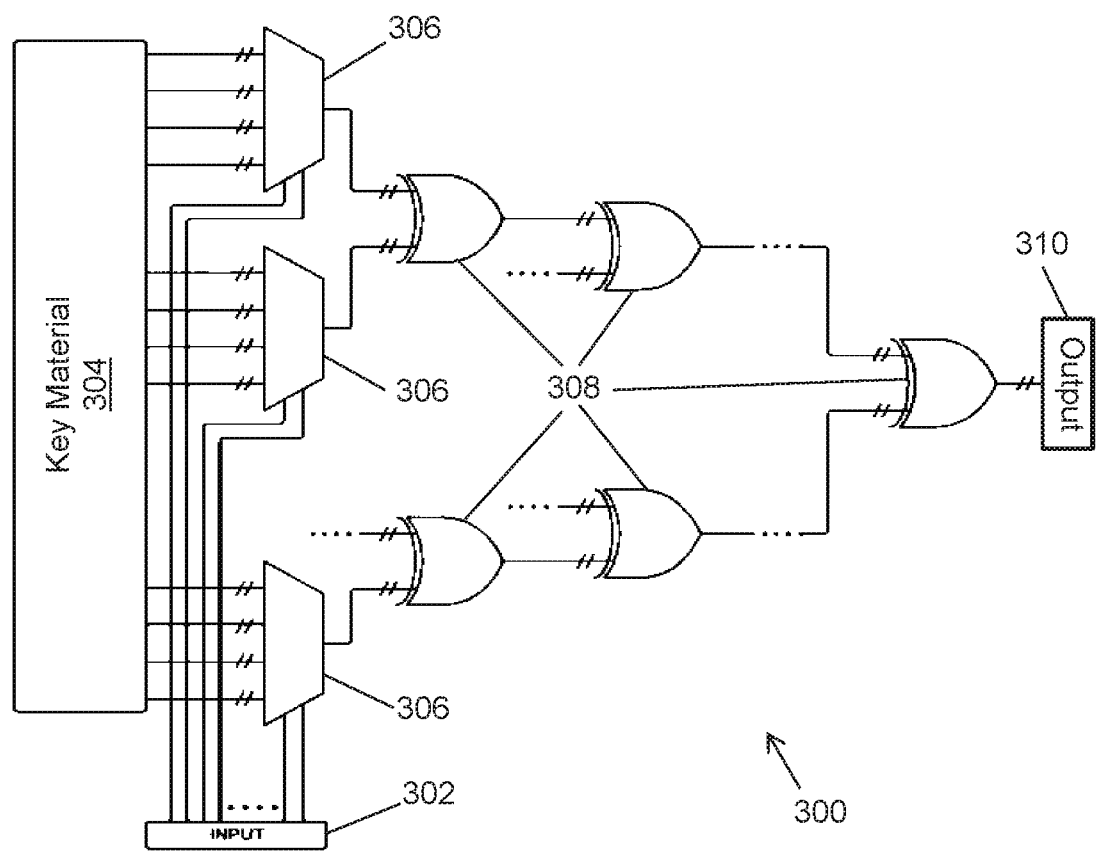
FIG. 3 is a schematic diagram of an XOR-tree based bit mixer according to various embodiments.
Figure 4:
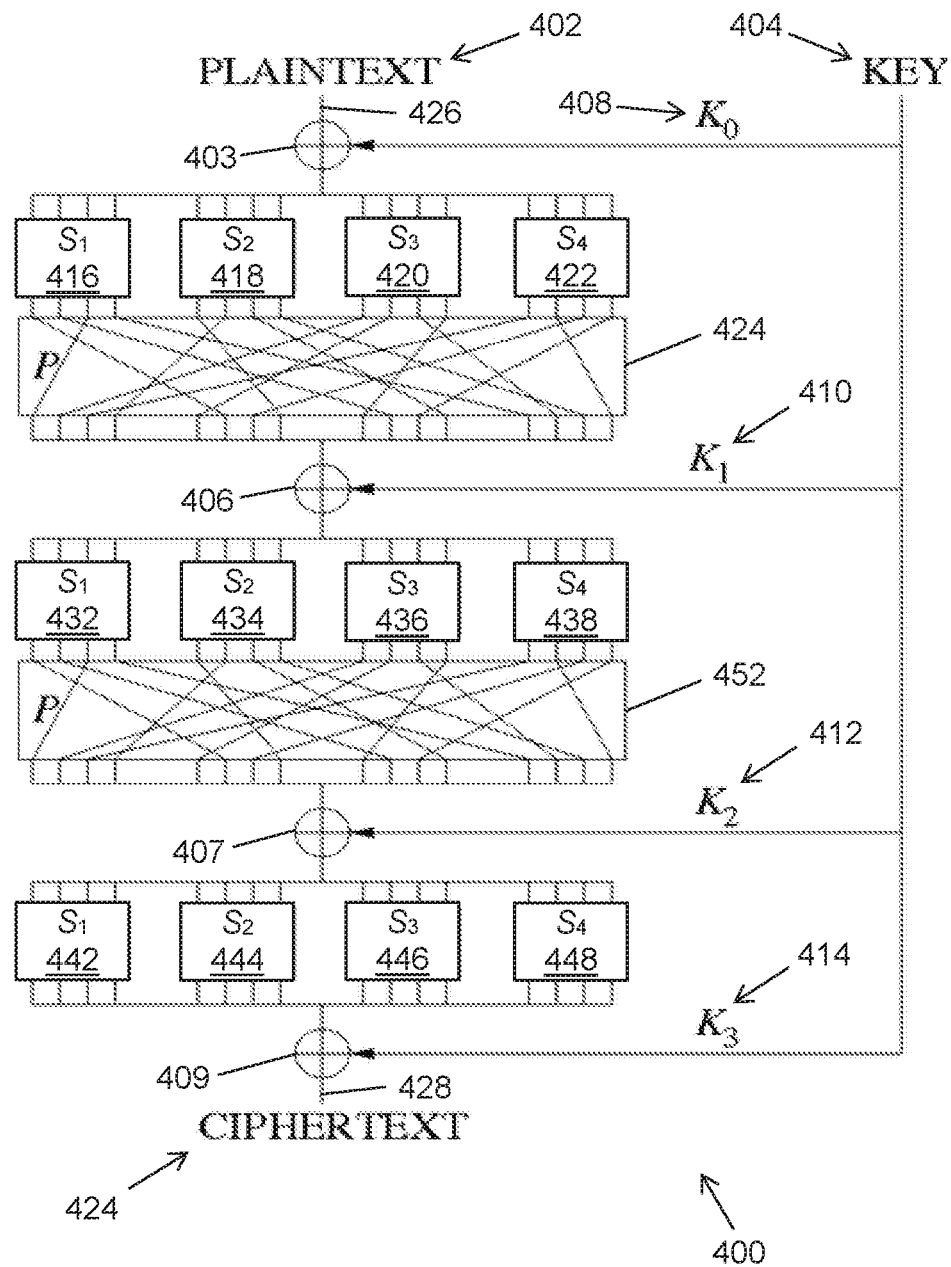
FIG. 4 is a schematic diagram of substitution-permutation network based bit mixer according to various embodiments.
Figure 5:
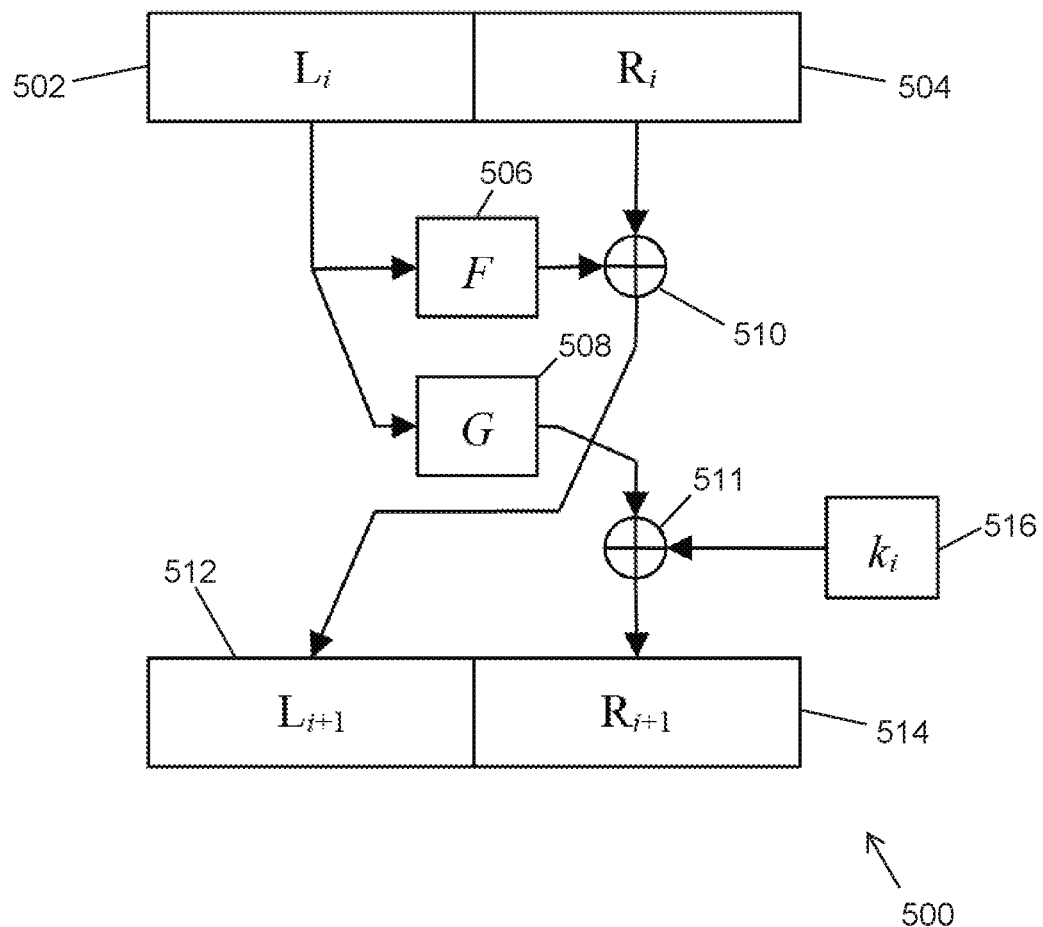
FIG. 5 is a schematic diagram of a single round of a double-mix Feistel network based bit mixer according to various embodiments.

FIGS. 3, 4, and 5 provide example bit mixers architectures, that include one or more of the above properties, according to various embodiments of systems 100 and 200.

FIG. 3 is a schematic diagram of an XOR-tree based bit mixer 300 according to various embodiments. Bit-mixers of this construction are straightforward to implement and offer high performance, improved security, low power consumption, and minimal side channel leakage.

Bit mixer 300 includes input 302, which may be implemented as a bus, for accepting input data. Bit mixer 300 also includes storage for key material 304. The storage may be implemented as volatile or persistent electronic memory. Bit mixer 300 further includes multiplexers 306 for combining key material 304 with the input data. To combine the input data with key material 304, the input data provided to input 302 is partitioned into multiple, possibly different length bit groups. Using multiplexers 306, the bits of the groups select certain parts of the key material 304, called subkeys. These subkeys are bitwise XOR-ed together by XOR gates 308 to generate coded data provided to output 310, which may be implemented as a bus.

As the width (i.e., number of bits) of the input data and the width of the output data of XOR-tree based bit-mixers can be independently chosen, expansion and compression functions may be created by selecting a longer output width or longer input width, respectively.

Having random key material, any single input bit change will cause the output of bit mixer 300 to change by a random subkey. As such, every output data bit is influenced by any input data bit change. Further, given the bit-mixers construction, multiple input bit changes will cause the output to change by an XOR-ed aggregation of random subkeys, which is in itself random. Therefore, XOR-tree based bit-mixers satisfy each of the desired properties as enumerated above and ensure theoretically perfect mixing.

Nevertheless, bit mixer 300 may be modified from the construction shown in FIG. 3 in order to remove linearity. That is, the construction of bit mixer 300 as shown in FIG. 3 is highly linear. In some applications, this linearity may present problems, but it is easy to modify bit mixer 300 to remove the linearity: at least one layer of the XOR operations (XOR gates at a given distance from the multiplexers) may be replaced by nonlinear S-Boxes, small (3×3 or 4×4) functions implemented by a handful of logic gates. Suitable S-boxes include S-boxes from the Data Encryption Standard (DES) and the Advanced Encryption Standard (AES). DES S-boxes may be modified to have the same size of inputs as outputs prior to implementation. AES S-boxes are eight-bits for both the size of the input data and the size of the output data, so need not be modified for size prior to implementation. Nevertheless, S-boxes from the PRESENT or PRINT cyphers are preferable, because they are small and efficient. The PRESENT cypher is disclosed in Bogdanov, Knudsen, Leander, Paar, Poschmann, Robshaw, Seurin, and Vikkelsoe (2007), "PRESENT: An Ultra-Lightweight Block Cipher", Lecture Notes in Computer Science, 4727 (Cryptographic Hardware and Embedded Systems—CHES 2007), pp. 450-466. The PRINT cypher is disclosed in Knudsen, et al, "PRINTcipher: a block cipher for IC-printing", International Workshop on Cryptographic Hardware and Embedded Systems, Springer, Berlin, Heidelberg, 2010, pp. 16-32. In particular, the PRESENT cypher S-boxes have input and output data lengths of four bits and may be implemented in hardware for very fast operation, e.g., only 18 gate delays per input data processing.

FIG. 4 is a schematic diagram of substitution-permutation network based bit mixer 400 according to various embodiments. Bit mixer 400 may be configured to be invertible, which is advantageous for certain applications. Bit mixer 400 includes input 426, which may be implemented as a bus, for receiving plaintext 402. Input 426 is operably connected to an input of a series of parallel XOR gates 403. A second input to the XOR gates 403 is configured to receive subkey $K_0$ from key material 404. Key material 404 may be stored in persistent or volatile electronic memory. The output of XOR gates 403 is coupled to the inputs of S-boxes 416, 418, 420, 424. (These 4 boxes represent any arbitrary long series of S-boxes.) The outputs of S-boxes 416, 418, 420, 424 are coupled to inputs to permutation block 424, and the outputs of permutation block 424 are coupled to an input to a series of parallel XOR gates 406. The other input to XOR gates 406 is coupled to key material 404 to receive subkey $K_1$. The second stage is similar to the first stage. The output of the parallel series of XOR gates 406 is coupled to inputs to the series of S-boxes 432, 434, 436, 438, and outputs of S-boxes 432, 434, 436, 438 are coupled to inputs to permutation block 454. The output of permutation block 454 are coupled to an input to the series of parallel XOR gates 407, and another input to XOR gates 407 is coupled to key material 404 to receive subkey $K_2$ 412. Several such stages can follow. As a final stage per the embodiment depicted in FIG. 4, the output of XOR gate 407 is coupled to the inputs to a layer of S-boxes 442, 444, 446, 448, and the outputs of S-boxes 442, 444, 446, 448 are coupled to an input to the series of parallel XOR gates 409. The other input to XOR gates 409 is configured to receive subkey $K_3$ 414 from key material 404. The output of XOR gates 409 provides output 428 of bit mixer 400, which may be implemented as a bus. Output 428 provides ciphertext 424 corresponding to plaintext 402.

For compression or expansion bit-mixers, the block size of bit mixer 400 may be chosen to be the larger of the sizes of the input data and the output data. If the size of the input data is smaller than the block size, then the unused bits of the block may be held constant or some bits may be repeated. If the size of the output data is smaller than the block size, then bits of the block may be discarded or folded together via XOR or S-Box functions to produce the output of bit-mixer 400.

In general, substitution-permutation network based bit mixers may iterate the following three actions two or more times.

(1) The data is transformed by a series of small nonlinear functions, S-boxes;

(2) The bits of the result are permuted (e.g., by being rerouted); and (3) The permuted data is XOR-ed with a subkey.

Note that the first and last iterations are often simplified, omitting one or two of the above actions. The embodiment of FIG. 4, for example, includes two full iterations that include all three of the above actions, as well as a partial first iteration that only includes action (3) and a partial final iteration that only includes actions (1) and (2). The first full iteration is provided by S-boxes 416, 418, 420, 422, permutation block 424, and XOR gate 406, and the second full iteration is provided by S-boxes 432, 434, 436, 438, permutation block 452, and XOR gate 407. The partial first iteration is provided by XOR gate 403, and the partial final iteration is provided by S-boxes 442, 444, 446, 448 and XOR gate 428

If the S-Boxes in a substitution-permutation network based bit mixer are invertible, then the substitution-permutation network based bit mixer itself will also be invertible. Likewise, if the S-Boxes in a substitution-permutation network based bit mixer are nonlinear, then the substitution-permutation network based bit mixer will be nonlinear as well.

Substitution-permutation network based bit mixers can be arbitrarily wide, but the number of rounds for a thorough mixing increases with the width (logarithmically).

There are many possibilities for S-boxes 416, 418, 420, 422, 432, 434, 436, 438, 442, 444, 446, 448. For example, the S-boxes from the PRESENT or PRINT cyphers as discussed above in reference to FIG. 3 may be utilized.

There are also many possibilities for permutation blocks 424, 452. For example, permutation blocks from the PRESENT or PRINT cyphers, from AES, or from the hash function SHA3, may be utilized. The permutation depicted in permutation blocks 424, 452 achieves perfect dispersion in the first few rounds; the bits affected by a single input bit-flip are fed into different S-boxes. There are many alternate choices for this permutation. An example is where the input block size to be mixed is b and the width of the S-Box is s. Then the following definition of permutation function P may be used:

$P(i)=s \cdot i \bmod b-1$ for $0 \leq i \leq b-2$; and $P(b-1)=b-1$.

FIG. 5 is a schematic diagram of a single round of a double-mix Feistel network based bit mixer 500 according to various embodiments. Double-mix Feistel network based bit mixers suitable for use with embodiments of FIGS. 1 and 2 may have multiple such rounds, e.g., three or more. As shown, round i starts with left input data 502 and right input data 504. Left input data 502 is transformed by function F 506 before being passed to an input to a series of parallel XOR gates 510. Right input data 504 is passed to the other input to the XOR gates 510. The output of XOR gates 502 becomes the left input data to the next stage, round i+1. Left input data 502 is transformed by function G 508 before being passed to an input of a series of parallel XOR gates 511. A subkey $k_i$ 516 for the stage i is taken from key material and passed to the other input to XOR gates 511. The output of XOR gates 511 becomes the right input data to the next stage, round i+1.

Even though Feistel networks transform only half their input bits in each round, direct implementation in software can completely consume a CPU. However, parallel hardware implementations of certain variants can gain a twofold speedup for the same mixing quality by transforming all intermediate data at each round. Such variants include double-mix Feistel networks as shown in FIG. 5. Double-mix Feistel networks are balanced variants of Feistel networks. The block size can be the larger of the input and the output size, repeating input bits or folding output bits as required for compressing or expanding bit-mixers.

For double-mix Feistel network based bit mixers, the data is processed in rounds, similar to Feistel networks, and the data is handled in two halves: L and R. In round i, two functions, F and G, compute values from $L_i$ and $R_i$, which give $L_{i+1}$, after two bitwise XOR operations. The very first values $L_0$ and $R_0$ are set to the input of the bit mixer, and the very last values after r rounds, $L_r$, $R_r$, constitute the output of the bit mixer. While $L_{i+1}$ is generated using a bitwise XOR operation of the output of F and $R_i$, a round key $k_i$ is mixed-in using a bitwise XOR operation with the output of G to generate as follows:

$L_{i+1}=F(L_i) \oplus R_i$ $R_{i+1}=G(L_i) \oplus k_i$

If G is invertible, then the resulting bit mixer will also be invertible. The inverse of G need not be easily computed unless the application uses the inverse of the bit-mixer. As such, G can be faster to compute than a typical S-Box layer, and it can process bits in distant positions, mixing the data better. An example of such a function is XOR-ing each input bit of G with two input bits from circular distances ($d_1$, $d_2$), taking minimal time in electronics. At power-of-two block lengths, these three-way XOR functions are invertible.

F does not have to be invertible, because its inverse is not needed even for an invertible bit mixer. In example implementations, a fast, sufficiently complex construction may be used, which is nonlinear in the Galois field of binary polynomials, as follows:

NAND bits of $L_i$ from circular distances $d_3$ and $d_4$;
NOR bits of $L_i$ at circular distances $d_5$ and $d_6$;
NAND bits of $L_i$ at circular distances $d_7$ and $d_8$; and
XOR the above three blocks of bits to $L_i$.

In hardware implementations, shifts are only wirings, consuming no time. The functions F and G are defined to be nearly equal in path length, requiring only a moderate amount of manual effort in the layout of the electronics to balance the critical timing paths for reduced side channel leakage. While F and G could be different in certain, if not all rounds, for simplicity, some embodiments make them the same in all rounds.

Thus, FIGS. 3, 4, and 5 show bit mixers that are suitable for inclusion in embodiments per FIGS. 1 and 2. Nevertheless, other bit mixers may be used in addition or in the alternative.

V. Conclusion

Figure 6:
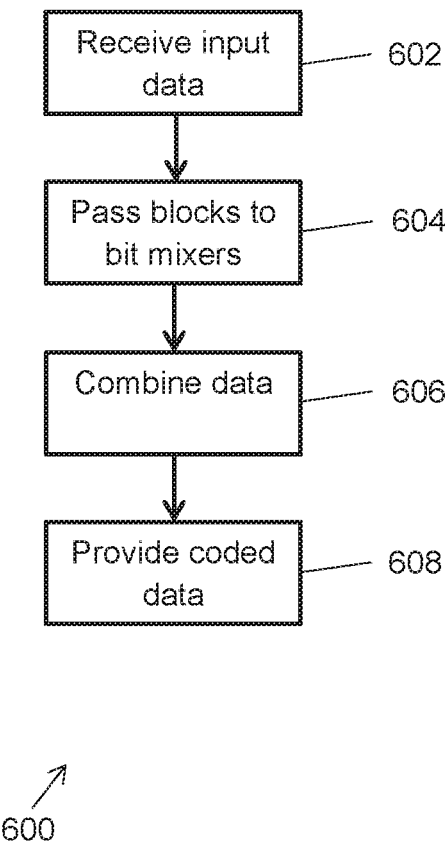
FIG. 6 is a flow diagram of a method for generating coded data from input data using parallel bit mixers according to various embodiments.

FIG. 6 is a flow diagram of a method 600 for generating coded data from input data using parallel bit mixers according to various embodiments. Method 600 may be implemented using system 100 of FIG. 1, for example. In particular, method 600 may be implemented in hardware or software.

At block 602, input data comprising a plurality of data blocks is received. The input data may be received on a bus, for example. According to some embodiments, the input data may be parsed into the plurality of data blocks at, or prior to, block 602.

At block 604, the plurality of data blocks is passed to a plurality of bit mixers connected in parallel. According to some embodiments, no two bit mixers of the plurality of bit mixers are configured to produce the same output values for the same input values. Technique for producing such diverse bit mixers are presented above in reference to FIG. 1. In passing the input data to the plurality of bit mixers, each block is passed to a different bit mixer of a plurality of bit mixers, where no bit mixer of the plurality of bit mixers receives the same block as another bit mixer. The bit mixers operate on their respective blocks.

According to various embodiments, multiple instances of block 604 may be performed, possibly separated by combiners such as XOR gates or XOR gate trees.

At block 606, the results of block 604 are passed to a combiner such as XOR gates or XOR gate trees.

At block 608, the output of the combiner is provided as coded data corresponding to the input data. Depending on how the bit mixers and combiners are configured, the coded data may be a hash of the input data, or may be a message digest corresponding to the input data.

This may complete method 600.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A device for generating coded data from input data, the device comprising:
   an input for receiving the input data, wherein the input data comprises a plurality of data blocks;
   a plurality of bit mixers communicatively coupled in parallel to the input, wherein each bit mixer of the plurality of bit mixers is configured to receive at least one data block of the plurality of data blocks, wherein no bit mixer of the plurality of bit mixers is configured to receive a same data block of the plurality of data blocks as another of the bit mixers of the plurality of bit mixers, and wherein no two bit mixers of the plurality of bit mixers are configured to produce same output values for same input values, and wherein block numbers from an enumeration of the plurality of data blocks is combined with subkeys of the plurality of bit mixers;
   a combiner communicatively coupled in parallel to the plurality of bit mixers; and
   an output communicatively coupled to the combiner, the output configured to provide the coded data corresponding to the input data.

2. The device of claim 1, wherein the coded data comprises a cryptographic hash of the input data.

3. The device of claim 1, wherein each bit mixer of the plurality of bit mixers operates under control of different subkey data.

4. The device of claim 3, wherein the coded data comprises a message authentication code for the input data.

5. The device of claim 1, wherein each bit mixer of the plurality of bit mixers is hard coded in hardware.

6. The device of claim 5, wherein the plurality of bit mixers consists of a number n of bit mixers in parallel, and wherein the device has n times less side channel leakage compared to actions of the device executed on a single programmable microprocessor.

7. The device of claim 5, wherein each bit mixer of the plurality of bit mixers produces a respective output from a respective input in a single clock cycle.

8. The device of claim 5, wherein each bit mixer of the plurality of bit mixers comprises a second plurality of second bit mixers configured in parallel.

9. The device of claim 1, wherein each of the bit mixers of the plurality of bit mixers comprises at least one of a XOR tree based bit mixer, a substitution-permutation network based bit mixer, or a double-mix Feistel network based bit mixer.

10. A method of generating coded data from input data using bit mixers, the method comprising:
    receiving the input data at an input, wherein the input data comprises a plurality of data blocks;
    passing the plurality of blocks to a plurality of bit mixers communicatively coupled in parallel to the input, wherein each bit mixer of the plurality of bit mixers receives at least one data block of the plurality of data blocks, wherein no bit mixer of the plurality of bit mixers receives a same data block of the plurality of data blocks as another of the bit mixers of the plurality of bit mixers, wherein no two bit mixers of the plurality of bit mixers are configured to produce same output values for same input values, and wherein block numbers from an enumeration of the plurality of data blocks is combined with subkeys of the plurality of bit mixers;
    combining outputs of the plurality of bit mixers to produce the coded data corresponding to the input data.

11. The method of claim 10, wherein the coded data comprises a cryptographic hash of the input data.

12. The method of claim 10, wherein each bit mixer of the plurality of bit mixers operates under control of different subkey data.

13. The method of claim 12, wherein the coded data comprises a message authentication code for the input data.

14. The method of claim 10, wherein each bit mixer of the plurality of bit mixers is hard coded in hardware.

15. The method of claim 14, wherein the plurality of bit mixers consists of a number n of bit mixers in parallel, and wherein a device performing the method has n time less side channel leakage compared to a single programmable microprocessor executing the method.

16. The method of claim 14, wherein each bit mixer of the plurality of bit mixers produces a respective output from a respective input in a single clock cycle.

17. The method of claim 14, wherein each bit mixer of the plurality of bit mixers comprises a second plurality of second bit mixers configured in parallel.

18. The device of claim 1, wherein each of the bit mixers of the plurality of bit mixers comprises at least one of a XOR tree based bit mixer, a substitution-permutation network based bit mixer, or a double-mix Feistel network based bit mixer.

* * * * *